Oct. 29, 1968 C. J. SCHMIDT ET AL 3,408,574
PORTABLE RADAR WARNING RECEIVER
Filed April 13, 1964 2 Sheets-Sheet 1

INVENTORS
CHARLES J. SCHMIDT
OLIVER CURRLIN
BY
*Nolte and Nolte*
ATTORNEYS

INVENTORS
CHARLES J. SCHMIDT
OLIVER CURRLIN

BY

*Nolte and Nolte*

ATTORNEYS

United States Patent Office 3,408,574
Patented Oct. 29, 1968

3,408,574
PORTABLE RADAR WARNING RECEIVER
Charles J. Schmidt, Islip, and Oliver G. Currlin, Massapequa, N.Y., assignors to Maxson Electronics Corporation, Great River, N.Y., a corporation of New York
Filed Apr. 13, 1964, Ser. No. 359,387
5 Claims. (Cl. 325—364)

ABSTRACT OF THE DISCLOSURE

A portable radar warning unit comprises a crossed polarization antenna coupled to video detectors. The output of the detectors is coupled to a video amplifier having a logarithmic gain characteristic. A switchable attenuator is provided at the input of the video-amplifier to provide a predetermined attenuation to the input video signals. The output of the logarithmic video amplifier is coupled to an output indicator. By selectively placing the attenuation into the amplifier the direction of the radiated radar signals as a function of the maximum strength thereof, and the range variation of the radar signal as a function of the time that it takes for the output signals to return to the value prior to the insertion of the attenuation, may be determined.

---

This invention relates to radar apparatus. More particularly, the present invention relates to a battery powered, portable radar receiver for detecting radiated radar energy.

There are numerous situations, particularly in the military, wherein a stationary or mobile unit must know whether it is being illuminated by a radar transmitter. or example, the pilot of a plane during a mission would wish to know whether or not hostile radar transmitters had illuminated the plane for the purpose of locating its position. Prior art radar warning receivers of this nature have been used, but such devices have suffered from various drawbacks, including seriously limited dynamic ranges over which they were operable. Moreover, such prior art receivers have been complex and cumbersome devices requiring separate installations in the vehicles in which they were to be carried.

Accordingly, the main objective of the present invention is to provide an improved receiver for detecting an operating radar system.

A more specific object of the invention is to provide a portable radar receiver responsive to radar radiation over a wide dynamic range of amplitudes.

Another object of the invention is to provide a portable radar warning receiver having a coarse direction finding and determining capability.

The above and other objects of the invention are accomplished through the use of a battery powered radar receiver, which, together with a novel antenna, is located in a small flashlight sized housing. The receiver includes a multi-stage video amplifier, each stage presenting high gain to weak signals and low gain to strong signals, with the overall gain characteristics of the amplifier being approximately logarithmic. Output means, such as earphones and/or a meter, are coupled to the output of the video amplifier to provide an immediate indication to the user that his vehicle is being illuminated by a radar system. In addition, switch means may be used to introduce a predetermined attenuation into the signals applied to the receiver, whereby observation of the signals before and after such attenuation serves as a coarse range indicating device. The antenna comprises a pair of transversely arrayed open end wave guides, which are responsive to both vertically and horizontally polarized rays. The radiation pattern is directional whereby movement of the transmitter from the axis of the radiation pattern may be roughly correlated with the direction of the transmitter.

The manner in which the above and other objects of the invention are accomplished will be more fully explained hereinbelow with reference to the following drawings, wherein.

Figure 1:
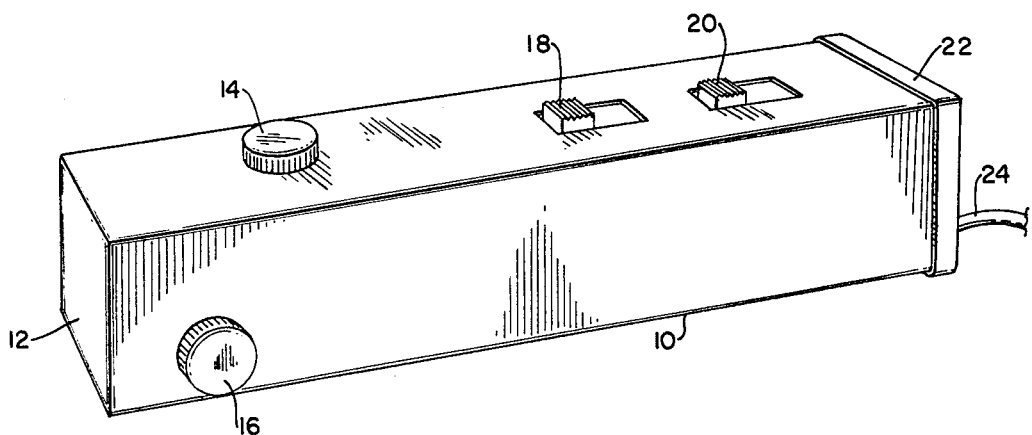
FIG. 1 is a perspective view of the entire device within its housing.

FIG. 1 is a perspective view of a radar receiver embodying the invention. The device includes an elongated housing 10 which may be generally square-shaped in cross section and approximately the size of a conventional flash light. The radome portion of the device, described more fully below, is located at one end 12 of housing 10. A pair of microwave crystal holder caps 14 and 16 protrude slightly from adjacent external surfaces of housing 10. As explained below, conventional crystal detectors are mounted in caps 14 and 16 for the receipt of both horizontally and vertically polarized waves, the detector outputs being coupled to the receiver circuitry within the housing 10. A switch 18 controls the on-off condition of the battery operated circuits, and an adjacent switch 20 varies the sensitivity of the device.

The end of housing 10 opposite radome 12 is closed by a square cap member 22 through which an output cable 24 extends. Cable 24 is coupled from the output of the receiver circuitry within housing 10 to external manifesting means such as earphones and/or a meter to indicate to the user the relative strength of the radar signals illuminating the receiver.

Figure 2:
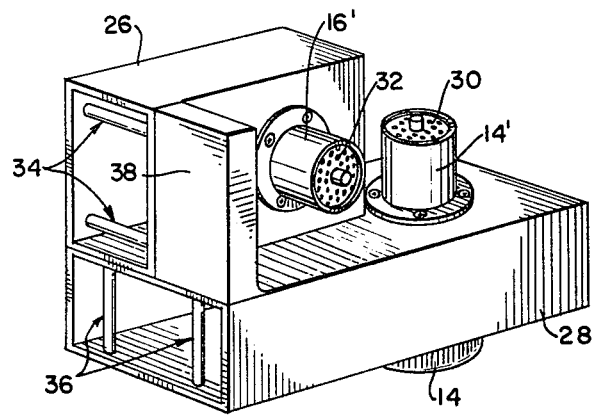
FIG. 2 is a perspective view of a preferred embodiment of the antenna.

FIG. 2 is a perspective view of a preferred embodiment of the antenna housed within radome portion 12 of housing 10. The antenna includes a first open-end rectangular wave guide section 26 and a second open-end rectangular wave guide section 28. The lengths of the respective waveguides are not critical, but section 28 may be made longer than wave guide section 26 to facilitate mounting of the antenna within housing 10. The two wave guide sections are physically arranged so that their longitudinal axes are parallel and their respective open ends lie in the same plane but transverse to each other to form an L. Holder caps 14 and 16, as shown in FIG. 2, also include internal flanged cylindrical members 14' and 16' which contain conventional microwave crystal detectors 30 and 32 including probes (not shown) extending transversely into their respective wave guide sections.

Since the two wave guide sections 26 and 28 are transverse to each other, the antenna is capable of receiving both horizontally and vertically polarized waves, and the outputs of the two crystal detectors 30 and 32 are connected in parallel to the input of the radar receiver circuitry within housing 10. This combination provides a detection capability for any direction of linear, or either sense circular, polarization.

Wave guide 26 further includes a pair of horizontal posts 34 and wave guide 28 a pair of vertical posts 36 to match the respective open end wave quides to free space. A rectangular block 38 may be used to facilitate mounting arrangements within housing 10, and, if desired, a plastic window may be glued over the open apertures to protect the interior portions of the wave guides.

Figure 3:
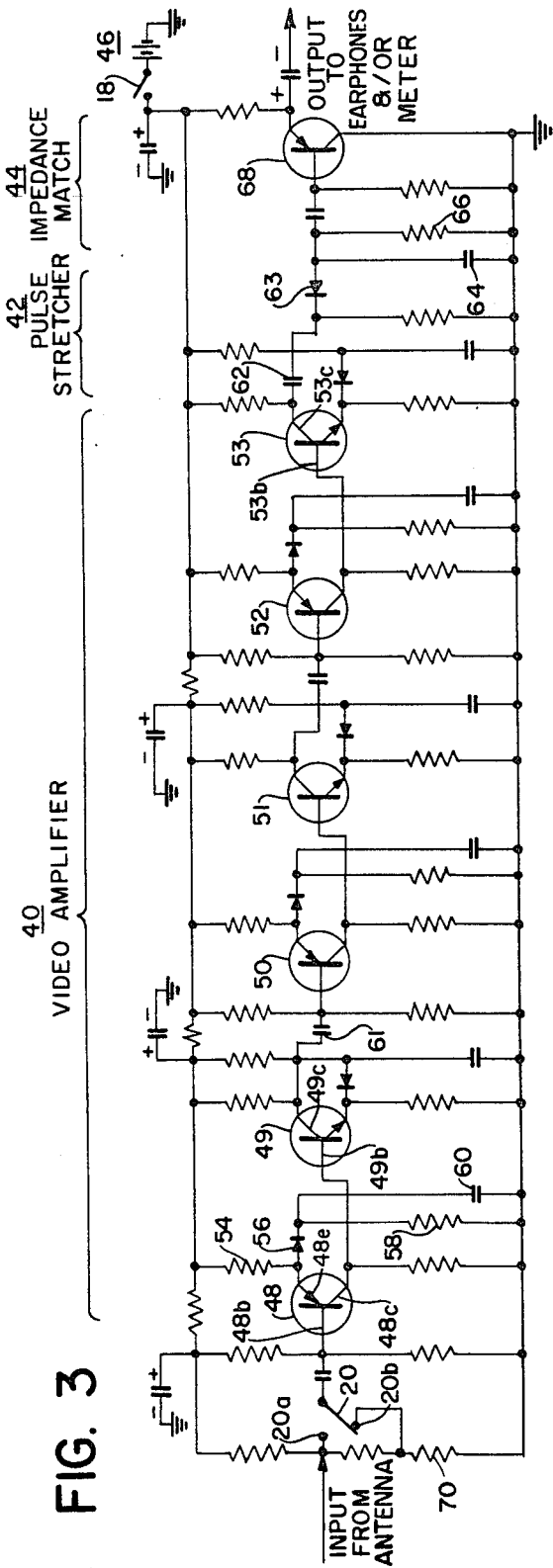
FIG. 3 is a circuit diagram of the receiver within the housing of FIG. 1.

FIG. 3 is a circuit diagram of the receiver within housing 10. The parallel connected detector outputs are connected to the input of a variable gain video amplifier 40, the output of which is coupled through a pulse stretcher 42 and an impedance matching stage 44 to output cable 24. The operating voltages for these elements of the receiver are derived from a battery 46.

Video amplifier 40 provides the receiver with an approximate logarithmic response wherein the gain of the amplifier is decreased for increasing input signal levels. This is achieved by six cascaded transistor amplifiers 48, 49, 50, 51, 52 and 53, each of which has a high gain for weak signals and a low gain for strong signals. Transistors 48, 50 and 52 are PNP transistors while transistors 49, 51 and 53 are NPN transistors. In all other respects the six stages of amplifier 40 are identical, and for this reason the operation of only the first stage, including PNP transistor 48, will be described.

The quiescent bias on transistor 48 is established by a voltage divider network including resistor 54, diode 56 and resistor 58. A capacitor 60 is connected in parallel with resistor 58 as an emitter bypass circuit as explained below in greater detail. Prior to the receipt of an incoming signal, the voltages developed across this voltage divider network maintain transistor 48 in a state in which incoming signals applied to its base will be amplified with maximum gain.

When a negative going input signal from the crystal detectors is applied to the base 48b of transistor 48, collector 48c is driven in a positive direction and emitter 48e in a negative direction. The voltage across capacitor 60 cannot change instantaneously and the incoming radar pulses will cause abrupt voltage changes at emitter 48e. Thus, when the negative going signal applied to base 48b exceeds a pre-determined limit, emitter 48e will be driven sufficiently negative with respect to the voltage stored on capacitor 60 to bias diode 56 into a non-conducting state. As a result, the emitter bypass circuit is removed from the circuit, and the gain of this amplifier stage is reduced to a value approaching unity.

The positive going voltage at collector 48c is directly coupled to the base 49b of NPN transistor 49, operation of which is identical to that described. The positive going voltage on base 49b appears as a negative going voltage at collector 49c, and this output voltage is coupled through a coupling capacitor 61 to the base of PNP transistor 50 which is identical to transistor 48. In this manner, the signals are amplified and inverted through the six stages of video amplifier 40. The amplified, negative going output pulse appearing at collector 53c is coupled through capacitor 62 to pulse stretcher 42.

Because the signal applied to the base 53b of transistor 53 is the largest of the signals applied to the stages of video amplifier 40, the gain of transistor 53 is switched to its lower value prior to any of the preceding amplifier stages. If the magnitude of the input signal is great enough, the gain of transistor 52 is also reduced followed by successive preceding stages as long as the signals applied to the respective bases are sufficient to remove the associated emitter bypass circuits. The net effect of this operation is that the overall gain characteristic of video amplifier 40 is approximately logarithmic (non-saturating) over a desired frequency range.

Pulse stretcher 42 includes a diode 63, capacitor 64 and resistor 66. After the video amplifier has amplified the detected radar pulse to a desired level, pulse stretcher 42 sufficiently stretches the typically low duty ratio radar pulse to improve the earphone and/or meter efficiency. In operation, the negative going pulse on the collector of transistor 53 passes through the low forward impedance of diode 62 to charge capacitor 64. When capacitor 64 is charged to the peak amplitude of the pulse, diode 62 is biased open (i.e., into a non-conductive state), and capacitor 64 discharged through the high resistance of resistor 66 thus providing a low impedance, short time charging circuit, and a high impedance, long time discharge circuit.

The output of pulse stretcher 42 is coupled to the base of a conventional emitter follower 68 which comprises the impedance matching stage 44, and is used to match the impedance of the pulse circuit 42 to that of the earphone, meter, or combination thereof. If earphones are used, the audio output is at the pulse repetition frequency of the illuminating radar transmitter.

A significant feature of the invention is the attenuation switch 20 which is a single pole, double throw switch connected between the parallel output of the microwave crystal detectors and the base of the first stage of video amplifier 40. When switch 20 contacts its terminal 20a, an attenuating resistor 70 is bypassed, but when the switch is manually moved to contact 20b, the crystal ouput is fed through attenuating resistor 70 which introduces a predetermined amount of attenuation, for example six decibels, into the input signal.

Attenuation switch 20 permits a step variation in receiver gain to aid in the estimation of range if there is relative movement between the illustrated receiver and the illuminating transmitter. Thus, when the attenuating resistor 70 is switched into the circuit adding six decibels of attenuation, the received signals will not reach their previous strength (i.e., before attenuation) until the distance between the transmitter and receiver has been reduced by half. This is in accordance with conventional theory, which indicates that a six decibel increase in signal level exists for every fifty percent reduction in distance between the receiver and transmitter. In operation, switch 20 is placed at terminal 20a which removes the attenuation, and the output signal is observed either aurally or visually. Switch 20 is then moved to terminal 20b and the time required for the output to reach the previously observed output level is noted. Considering the relative speed between a stationary transmitter and receiver, it is then possible to make coarse range observations in this manner, the product of velocity and the measured time interval being equal to the distance between the receiver and transmitter. If the radar transmitter is in a pursuing aircraft, the observed time interval is the time remaining before the pursuer reaches the receiver location.

Figure 4:
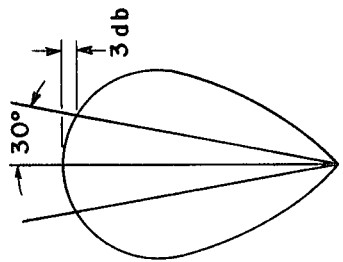
FIG. 4 is a schematic illustration of the radiation pattern of the antenna of FIG 2.

The antenna illustrated in FIG. 2 has a directional radiation pattern in either plane as indicated in FIG. 4. Thus, the device is also capable of observing bearing, since a thirty-degree change in either direction from the bore axis of the antenna will decrease the receiver output by approximately three decibels; hence, by observing signal changes the operator can point the antenna at the transmitting radar with an accuracy of thirty degrees. This can only be accomplished if the receiver does not saturate and provides a change in output intensity over a wide dynamic range of received signals.

Figure 5:
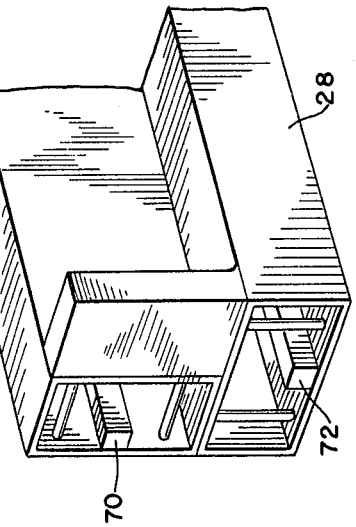
FIG. 5 is a perspective view of another embodiment of an antenna which may be used with the invention.

The illustrated embodiment is of particular utility in the frequency region from 1 kmc. to 70 kmc. (i.e., X-band), but the invention is not so limited. FIG. 5 is a perspective view of another embodiment of the antenna useful at C band frequencies and below. This embodiment is similar in all respects to the antenna of FIG. 2, except that wave guides 26 and 28 include ridges 70 and 72, respectively, to permit a reduction in the aperture area of the antenna at any given frequency. It is desirable to use ridged wave guides at C-band frequencies and below to reduce the over-all size of the antenna.

Although a preferred embodiment of the invention has been shown and described, the invention is not so limited and various modifications thereof will be obvious to those skilled in the arts. For example, the illustrated amplifier circuit for providing a logarithmic response may be replaced by conventional circuits using successive saturation and addition; well known devices such as boxcars and gated boxcars may be used in place of the illustrated pulse stretcher. Many other modifications will also be obvious to those skilled in the art, and the invention should not be limited except as defined in the following claims.

We claim:

1. A radar warning device comprising a housing, antenna means mounted to said housing for receiving horizontally and vertically polarized radar signals, detector means coupled to said antenna, for deriving video signals from said radar signals, a logarithmic video-amplifier having means for instantaneously controlling the gain of said amplifier in inverse proportion to the magnitude of said video signals, switchable attenuation means connected between the output of said detector means and the input of said video amplifier for introducing a predetermined attenuation to the level of said video signals, and output indicating means connected to the output of said amplifier, whereby the introduction of said attenuation means into said amplifier provides an indication of the rate of movement of the source of said radar signals as a function of time for the indication of said indicating means to return to its level prior to the introduction of said attenuation means.

2. The radar warning device according to claim 1, wherein said attenuation is a fixed attenuation of approximately six db.

3. The device according to claim 1, comprising a power supply means for supplying voltage to said amplifier located within said housing.

4. A device according to claim 1, wherein said video amplifier comprises a plurality of separate amplifier stages connected in cascade, each of said stages including means for varying the operating voltages applied to its associated stage when the input voltage to that stage exceeds a predetermined limit, whereby the gain of said video amplifier varies approximately logarithmically in an inverse relationship with respect to the input signal applied to the video amplifier.

5. A device according to claim 4, wherein said output means includes pulse stretcher means connected from the output of said video amplifier.

References Cited

UNITED STATES PATENTS

| | | | |
|---|---|---|---|
| 1,819,299 | 8/1931 | Miller | 325—380 |
| 3,163,861 | 12/1964 | Suter | 325—310 XR |
| 3,206,620 | 9/1965 | Freeman et al. | 328—145 XR |
| 3,321,708 | 5/1967 | Olson | 328—151 XR |

KATHLEEN H. CLAFFY, *Primary Examiner.*

R. S. BELL, *Assistant Examiner.*